(12) United States Patent
Gahlmann

(10) Patent No.: US 8,680,193 B2
(45) Date of Patent: Mar. 25, 2014

(54) AQUEOUS DISPERSION PRIMER, COATING MADE THEREOF AND METHOD FOR PRODUCING A VAPOR BARRIER OR AN INTERMEDIATE LAYER ON A SUBSTRATE

(75) Inventor: Frank Gahlmann, Hilchenbach (DE)

(73) Assignee: Stauf Klebstoffwerk GmbH (DE)

( * ) Notice: Subject to any disclaimer, the term of this patent is extended or adjusted under 35 U.S.C. 154(b) by 614 days.

(21) Appl. No.: 12/698,248

(22) Filed: Feb. 2, 2010

(65) Prior Publication Data

US 2011/0186223 A1     Aug. 4, 2011

(51) Int. Cl.
*C08K 3/18*     (2006.01)
*C08K 3/22*     (2006.01)

(52) U.S. Cl.
USPC ........... 524/432; 524/433; 524/475; 524/487; 524/521

(58) Field of Classification Search
USPC .......................... 524/432, 433, 475, 487, 521
See application file for complete search history.

(56) References Cited

U.S. PATENT DOCUMENTS 3,223,518 A * 12/1965 Hansen ........................ 71/64.07
2008/0196463 A1* 8/2008 Hudson et al. ................... 71/28

* cited by examiner

*Primary Examiner* — James J Seidleck
*Assistant Examiner* — Marie Reddick
(74) *Attorney, Agent, or Firm* — Schwegman Lundberg & Woessner, P.A.

(57) ABSTRACT

The present invention relates to an aqueous dispersion primer, a coating produced therewith and a method for the production of a vapour barrier or of an intermediate layer. The aqueous dispersion primer based on a polymer for cement and/or other subfloors is characterised in that it contains in an aqueous dispersion the following materials:

a) ≥23% by weight of silanised styrene-acrylate copolymer and
b) ≥7.5% by weight of vinylidene chloride-acrylate copolymer and
c) ≥0.5% by weight of styrene-butadiene copolymer-paraffin wax mixture and
d) ≥0.5% by weight of additives, the percentage data relating to the mass of the dispersion primer, ready for handling.

15 Claims, 1 Drawing Sheet

| NAME | CHEMISTRY | FUNCTION | PRODUCER | PORORTION (%) |
|---|---|---|---|---|
| VINNAPAS SAF 54 | SILANISED STYRENE-ACRYLATE DISPERSION | BONDING AGENT | WACKER CHEMIE AG, MUNICH, GERMANY | 67.1 |
| POLIDENE 33.082 | VINYLIDENE CHLORIDE-ACRYLATE COPOLYMER DISPERSION | BONDING AGENT | SCOTT BADER COMPANY LTD, WOLLASTON, ENGLAND | 25 |
| ULTRASEAL W-953 | DISPERSION OF A MIXTURE OF A STYRENE-BUTADIENE COPOLYMER AND A PARAFFIN WAX | HYDROPHOBISING | KEIM-ADDITEC SURFACE GMBH, KIRCHBERG, GERMANY | 3.9 |
| AGITAN 282 | HYDROPHOBIC SILICIC ACID, COPOLYMERS AND NON-IONIC EMULSIFIERS | ANTIFOAMING AGENT | MÜNZING CHEMIE GMBH, HEILBRONN, GERMANY | 0.1 |
| DISPONIL FES 77 | FATTY ALCOHOL POLYGLYCOLETHER-ULFATE SODIUM SALT | EMULSIFIER | COGNIS GMBH, MONHEIM, GERMANY | 0.2 |
| LUMITEN N-OG | FATTY ALCOHOL ETHOXYLATE | EMULSIFIER | BASF AG, LUDWIGSHAFEN, GERMANY | 0.3 |
| SODIUM HYDROXIDE | SODIUM HYDROXIDE | PH VALUE ADJUSTMENT | | 0.3 |
| LATEKOLL D | ACRYLATE-COPOLYMER DISPERSIONS | THICKENER | BASF AG, LUDWIGSHAFEN, GERMANY | 1 |
| GINSER 128 N | MIXTURE OF: 5-CHLORO-2-METHYL-4-ISOTHIAZOLIN-3-ON 2-METHYL-4-ISOTHIAZOLIN-3-ONE 2-BROMO-2-NITRO-1,3-PROPANEDIOL GLUTARALDEHYDE | PRESERVATIVE | GINSER GMBH, MUNICH, GERMANY | 0.05 |
| IRGANOX 245 DW | DISPERSION OF A STERICALLY HINDERED PHENOL: ETHYLENEBIS(OXYETHYLENE)BIS-(3-(5-TERT-BUTYL-4-HYDROXY-M-TOLYL)-PROPIONATE | ANTIOXIDANT | CIBA SPECIALTY CHEMICALS CORPORATION, BASLE, SWITZERLAND | 0.1 |
| WATER | | VISCOSITY ADJUSTMENT | | 2 |

*FIG. 1*

AQUEOUS DISPERSION PRIMER, COATING MADE THEREOF AND METHOD FOR PRODUCING A VAPOR BARRIER OR AN INTERMEDIATE LAYER ON A SUBSTRATE

The present invention relates to an aqueous dispersion primer, a coating of a subfloor produced therewith and also to a method for producing a water vapour barrier or an intermediate layer for a floor covering using the aqueous dispersion primer.

Dispersion primers of this type are used in floor technology, in particular on cement subfloors.

An essential factor in floor technology and basically in covering cement subfloors is the moisture content of the subfloor. Subfloors of this type can have a high moisture content, for example because of too short a drying time or also because of a permanent source of moisture below the subfloor. Subfloors of this type are for example, concrete, cement, screeds or cement flow screeds.

A damage-free construction of a floor construction or a damage-free covering of such a subfloor with further materials can only be effected here if the water content of the subfloor is in equilibrium with the average room air conditions (equilibrium moisture of the material). Should this state of equilibrium at the time of the further floor construction not yet be achieved as a result of too short a drying time or should a permanent source of moisture below the subfloor be present, the result with long term equilibrium adjustment of the moisture content is water vapour diffusion from the subfloor into the surrounding air. This is unproblematic as long as the subfloor is not covered with a floor covering or only layers with a very low water vapour diffusion resistance are applied.

In the case of most floor constructions, a plurality of layers are however installed, for example primers, levelling compounds, adhesives, foils, floor coverings such as parquet, and finally also surface treatment agents which respectively have in part very high water vapour diffusion resistances. Then in the case of multilayer constructions, the layer sequence must be chosen such that the water vapour diffusion resistance of the individual layers reduces with increasing distance from the source of moisture.

In the case of typical constructions and layer sequences in floor technology, this means in practice that, on a subfloor with an increased moisture content not in the equilibrium state, the diffusion rate of water vapour from the subfloor through a primer with water vapour diffusion barrier properties (water vapour diffusion barrier) must be less than the water vapour diffusion rate through the top covering situated thereon.

In order to resolve this physical constructional problem, special water vapour barrier primers based on different raw materials are used in the state of the art. Water vapour barrier primers of this type should however only be applied on cement subfloors, such as cement screeds, cement flow screeds or concretes—on the basis of their hydraulic properties and their water-resistance. In the case of calcium sulphate or magnesite systems, a coating with a water vapour barrier would include the danger of loss of strength because of the partial water solubility of the materials.

Basically, the diffusion flow of water vapour from the cement or other subfloor is essentially determined by the following three parameters, namely:
the contained quantity, i.e. the absolute water content in the subfloor which determines how long a diffusion process can continue and what total quantities can be transported;
the potential, i.e. the concentration- or partial pressure difference for water vapour across the subfloor; and
the transport paths, i.e. the construction of the subfloor and the coating thereof.

Most widely used are 2-component epoxy resin primers (EP primers, e.g. Stauf VEP-190), the resin component of which generally comprises low-molecular bisphenol A/F resin mixtures with low-viscous aliphatic glycidyl ethers as reactive thinners and the hardener component comprises a polyamine/polyamide mixture. These epoxy resin primers can be solvent-free or solvent-containing and are distinguished by good penetration into the subfloor and as two-component materials by reliable hardening due to chemical reaction in a large band width of handling circumstances. The hazard potential of both components above all is disadvantageous, which makes extensive measures necessary for protection of the handler. The hazard potential of these EP primers for humans and environment can be deduced already from the necessary hazardous material signs. Thus the epoxy resin component is generally characterised as an irritant and environmentally hazardous with the corresponding risk and safety information, the amine hardener component is generally at least classified as corrosive with the corresponding risk and safety information. A technical application disadvantage of epoxy resin primers resides in the fact that adhesion on a hardened primer can be achieved only with great difficulty. The further components of the floor construction, such as intermediate primers, different types of adhesive or mineral levelling compounds do not achieve adequate adhesion on a hardened EP primer. In order to ensure adequate adhesion, the EP primer must be applied in two layers and then the second layer must have large quantities of quartz sand scattered thereon. Approximately half of the sand scattered in excess must be removed after hardening and disposed of. The adhesion of the further layers is then effected primarily on the surface of the sand particles which protrude from the epoxy resin surface.

Also corresponding to the state of the art are polyurethane primers which are generally one-component (1-C) and based on diphenylmethane diisocyanate prepolymers (MDI) (e.g. Stauf VPU-155). These primers can likewise be solvent-free or solvent-containing. Penetration into a porous subfloor depends upon the molecular weight of the prepolymer and the solvent content. It is generally poorer in the case of 1-C polyurethane primers, than in the case of 2-component EP primers. The use of solvents in interior construction and hence also in floor technology no longer corresponds nowadays however in large part to the state of the art. In the case of one-component polyurethane primers, the hardening reactions and hence also the end state of the forming polymer film are greatly dependent upon environmental conditions, in particular room temperature, the relative room air humidity, the subfloor temperature and the water content of the subfloor. The varyingly pronounced degrees of $CO_2$ evolution during the hardening reactions represents a problem, which leads to a porous polymer film which impairs both the mechanical and the water vapour diffusion barrier properties. The MDI-based polyurethane primers represent a hazard potential for the handler which can be read most simply already on the hazardous material signs as health endangering, in conjunction with the corresponding risk and safety information. The known sensitising potential of isocyanate is particularly critical. Adhesion of the further component of a floor construction on such polyurethane primers is likewise problematic. In order to produce an adhesive bond, mineral levelling compounds, as in the case of EP primers, likewise require sanding of the primer surface. Before application of adhesives, often an intermediate primer is also required.

The barrier effect on the water vapour diffusion with these one-component polyurethane primers tends to be less than with two-component epoxy resin primers, which can be attributed inter alia to the higher polarity and the foam structure of the polymer film.

BRIEF DESCRIPTION OF THE DRAWINGS

FIG. 1 illustrates a composition of a dispersion primer according to one example of the present disclosure.

Starting from this state of the art, it was the object of the present invention to make available a primer dispersion and also a primer produced therewith as water vapour barrier or intermediate layer, which, on normal cement or other subfloors with a high moisture content, have a sufficiently high reduction in the water vapour diffusion rate, a widely diversified intermediate layer adhesion for different subfloors and different coatings of the floor construction which is intended to be applied simply and is intended to have in particular no health risks for the handler. Furthermore, it is the object of the present invention to make available a method for producing a water vapour barrier on a cement subfloor and also a method for adhesion of a floor covering on a cement and/or other subfloor with the objectives indicated above for the dispersion.

This object is achieved by the aqueous dispersion primer according to claim 1, the coating according to claim 9, and also the methods. Advantageous developments of the dispersion primer according to the invention, of the coating according to the invention and also of the methods according to the invention are indicated in the respective dependent claims.

According to the invention, the aqueous dispersion primer which is provided for further handling on a cement and/or other subfloor has the following materials:
a) ≥23% by weight of silanised styrene-acrylate copolymer and
b) ≥7.5% by weight of vinylidene chloride-acrylate copolymer and
c) ≥0.5% by weight of styrene-butadiene copolymer (SBR)-paraffin wax mixture and
d) ≥0.5% by weight of additives.

The aqueous dispersion primer can have in particular the following proportions of components:
a) 27.5 to 40% by weight of a silanised styrene-acrylate copolymer and/or
b) 7.5% to 17.5% by weight of a vinylidene chloride-acrylate copolymer and/or
c) 0.5 to 5.5% by weight of a mixture of a styrene-butadiene copolymer with a paraffin wax and/or
d) 47 to 64% by weight of water and/or
e) 0.5 to 5% by weight of additives.

Such a dispersion for applying as primer on cement or other subfloors can be produced in that the following materials are added:
a) 55 to 80% by weight of a silanised styrene-acrylate copolymer dispersion, preferably 60 to 75% by weight, advantageously with a water proportion of 50% by weight,
b) 15 to 35% by weight of a vinylidene chloride-acrylate copolymer dispersion, preferably 20% to 30% by weight, preferably with a water proportion of 50% by weight,
c) 1 to 10% by weight of a styrene-butadiene copolymer-paraffin wax blend dispersion, preferably 2 to 7% by weight, preferably with a water proportion of 45% by weight,
d) 0 to 10% by weight of water, preferably 2 to 7% by weight and/or e) 0.5 to 5% by weight of additives, preferably 1.5 to 2.5% by weight,
the proportion of components a) to e) in the finished dispersion formulation adding up to ≤100%.

There are used as supplements/additives preferably emulsifiers, preservatives, antifoaming agents, wetting aids, rheological additives, antioxidants, film-forming aids, basic additives for adjusting the pH value, pH buffer, zinc oxide, magnesium oxide and/or surface-active substances.

As crucial advantages of the primer dispersion according to the invention, it is revealed that, with it, with a corresponding application quantity, for example with an application of 500 to 700 g/m$^2$ on a cement subfloor, an outstanding water vapour diffusion barrier or block can be produced. With a lower application quantity, for example with an application of 100 to 150 g/m$^2$, an outstanding intermediate layer for a floor construction is produced by means of the dispersion primer. When using the aqueous dispersion primer according to the invention, the step of sanding which is nowadays often required can be dispensed with, nevertheless outstanding adhesion of the next layer of the floor coating applied thereon being provided. Further advantages are produced from the fact that the aqueous dispersion primer is solvent-free and carries neither a hazard symbol according to the international GHS system nor according to national hazardous material specifications. Therefore, in contrast to the reaction resin systems based on epoxy or polyurethane which are normally used nowadays according to the state of the art, of concern here is a material which is completely non-hazardous for the handler.

With the aqueous dispersion primer according to the invention, a subfloor coating according to the invention can be produced, with which a floor construction on a cement subfloor with an increased moisture content not corresponding to the equilibrium state is possible without damage. Furthermore, as already mentioned above, it is advantageous with the primer according to the invention that, because of the specific composition thereof, it has very good adhesion on a very large band width of substrates (subfloors or adhesives and levelling compound for floor coverings) and hence is very suitable for producing the intermediate adhesive layer in a multilayer floor construction.

Furthermore, the primer according to the invention fulfils all the requirements of a primer and a water vapour barrier, namely
good penetration into the subfloor;
formation of a stable polymer film;
strengthening of the subfloor;
good adhesion;
high electrolyte stability of the liquid primer which is used for the processing;
saponification resistance on alkaline (in particular cement) substrates (subfloors); and also
hydrophobia The primer can be used on all subfloors current in floor technology: concrete, cement, cement screed, cement flow screed, cement mortar, cement-bonded wood fibre, ceramics, natural stone, calcium sulphate screed, calcium sulphate flow screed, magnesite screed, sanded asphalt mastic, wood, fibreboard, plywood, gypsum, gypsum fibreboard, gypsum plasterboard, hardboard or mineral levelling compounds. The primer allows very good adhesion to all further components normal in floor technology in a layer construction: dispersion adhesives based on polyacrylate dispersions, dispersion adhesives based on polyvinyl acetate dispersions, dispersion adhesives based on styrene-butadiene latex, solvent-based adhesives (based on polyvinyl acetate or polyvinyl ether), 1-component polyurethane adhesives, 2-component polyurethane adhesives, powder adhesives based on vinyl acetate-ethylene copolymer powder with reactive cement or calcium sulphate component, SMP adhesives, cement levelling compounds, calcium sulphate levelling compounds, polyurethane levelling compounds, dispersion-based levelling compounds.

According to the invention, a coating of a cement and/or other subfloor can include:
a) ≥45% by weight of silanised styrene-acrylate copolymer and
b) ≥14% by weight of vinylidene chloride-acrylate copolymer and
c) ≥1% by weight styrene-butadiene copolymer-paraffin wax mixture and
d) ≥1% by weight of one or more additives.

The coating can have, in particular, the following proportions of components:
a) 52 to 80% by weight of a silanised styrene-acrylate copolymer and/or
b) 14% to 35% by weight of a vinylidene chloride-acrylate copolymer and/or
c) 1 to 11% by weight of a mixture of a styrene-butadiene copolymer with a paraffin wax and/or
d) 1 to 10% by weight of one or more additives.

In addition, the primer can be used in a defined time window, within which the still reactive groups are present (up to 72 hours), also on epoxy resin- and polyurethane primers or -vapour barriers as adhesion promoters for the further layer construction.

If the silanised styrene-acrylate polymers with an average particle size of less than 150 nm are used, then this small particle size ensures particularly deep penetration of the primer into the porous structure of a cement subfloor. Due to the good penetration, the result after filming is an effective pore seal and hence construction of a particularly high water vapour diffusion resistance.

If a surface-active substance is used as additive, then a particularly high electrolyte stability of the dispersion primer can be achieved, which is helpful in particular for penetration into the cement structures.

With a high styrene proportion in the styrene-acrylate copolymer, the water vapour diffusion barrier effect is further increased because of the hydrophobia of the styrene.

If the dispersion primer according to the invention is applied in a quantity of 100 to 150 g/m² on a subfloor, e.g. with a foam roller, then after drying, a layer thickness in the range of 50 to 75 μm is produced which is structurally solid already 30 minutes after application and is workable for further floor construction. The thus produced coating then comprises a closed polymer film which adheres very well to all adhesives and levelling compounds normal in floor technology.

If the dispersion primer according to the invention is applied in a quantity of 500 to 700 g/m², e.g. with a spreader, then after drying a layer thickness in the range of 250 to 350 μm is produced, which is structurally solid at the latest two hours after application and is workable for further floor construction. The thus produced coating then comprises a closed polymer film which, in addition to the advantageous adhesion properties, has a particularly high barrier effect against water vapour.

The aqueous dispersion primer according to the invention has, as coating on a subfloor, high water resistance and alkali resistance which is absolutely necessary on cement subfloors. The coating is exceptionally stable against hydrolysis.

The styrene-acrylate copolymer determines inter alia, via its glass transition temperature and the polarity of the polymer, the good adhesion properties of the primer according to the invention. Good wetting behaviour is ensured if surface-active additives are added. The adhesion to less polar substrates is produced in particular with an advantageously high proportion of vinylidene chloride-acrylate copolymer and also the styrene-butadiene-paraffin wax mixture.

Advantageous improvements to the aqueous dispersion primer according to the invention are produced if the content of solid polymers in the dispersion primer, ready for handling, is between 36 and 53% by weight. Furthermore, it is advantageous if the vinylidene chloride-acrylate copolymer contains at least 40% by weight of chlorine. Furthermore, it is advantageous if the proportion of polymerised vinylidene chloride of the entire polymer of the dispersion primer is at least 14% by weight.

EXAMPLES

An example of an aqueous dispersion primer according to the invention is provided subsequently.

In the single FIG. 1, the composition of a dispersion primer according to the invention is displayed in a table.

With this aqueous dispersion primer, the water vapour permeability on a cement subfloor with an adjusted moisture content was determined.

For this purpose, a water vapour diffusion barrier coating was applied on the cement subfloor using the dispersion primer given by way of example (FIG. 1). Subsequently, the effusion from the monolithic cement subfloor sealed on five sides through the coating to be tested into the residual air space was measured. The development of the relative air humidity in the defined residual air space was recorded for this purpose with the help of a hygrometer.

For the experiment, there was poured into a cuboid test vessel, open at the top, with a basic area of 30×30 cm and a height of 25 cm firstly a 5 cm thick layer of cement screed and it was left to harden for 72 hours. The water content of the screed at this time was 6.5% by weight. Subsequently, the dispersion primer, given by way of example, was applied at a layer thickness of 600 g/m² and left to dry for 24 hours. Subsequently, a hygrometer was installed in the sample volume and the test construction was sealed in an airtight manner with a cover ($t_0$). After 10 hours ($t_1$), the adjusting relative air humidity was measured. The ambient temperature was kept constant during the entire test duration at 23° C., the surrounding air humidity at 50% relative humidity. In a parallel experiment, instead of the dispersion primer given by way of example, a 1-C polyurethane primer (Stauf VPU-155) was tested under otherwise identical test conditions.

The relative air humidity of 100% which is set in a comparable test construction without coating of the cement serves as reference value.

After repetition eight times of the measurements, a relative air humidity was produced at the time $t_1$ of 68.2%±1.9% for the 1-C polyurethane primer and of 75.7%±2.2% for the dispersion primer, given by way of example, with the composition according to FIG. 1. The water vapour barrier effect of the 1-C polyurethane primer was hence 31.8% (=100%-68.2%), the dispersion primer, given by way of example, 24.3% (=100%-75.7%).

It emerges from these measured values that the water vapour diffusion resistance of the dispersion primer, given by way of example, is approx. 75% of the water vapour diffusion resistance of the 1-C polyurethane primer used. Practical suitability of the dispersion primer according to the invention up to a water content of approx. 4.5% by weight of a cement subfloor is deduced therefrom.

The aqueous dispersion primer given by way of example according to the invention is therefore suitable for producing an adhesion promoter layer, intermediate layer or water vapour diffusion barrier layer on any type of subfloors, in particular on cement subfloors.

The claimed invention is:

1. An aqueous dispersion primer for a subfloor common in interior construction wherein the subfloor includes concrete, cement, cement screed, cement flow screed, cement motar, cement-bounded wood fibre, ceramics, natural stone, calcium sulphate screed, calcium sulphate flow screed, magnesite screed, mastic asphalt, wood, fibreboard, plywood, gypsum, gypsum fibreboard, gypsum plasterboard, hardboard or mineral leveling compound, said primer comprising, in an aqueous dispersion, the following materials:
    a) ≥23% by weight of silanised styrene-acrylate copolymer, wherein an average particle size of the silanised styrene-acrylate copolymer is less than 150 nanometers and the silanised styrene-acrylate copolymer dispersion is capable of being self crosslinkable during drying at room temperature,
    b) ≥7.5% by weight of vinylidene chloride-acrylate copolymer,
    c) ≥0.5% by weight of styrene-butadiene copolymer-paraffin wax mixture and
    d) ≥0.5% by weight of one or more additives,
the percentage data relating to a mass of the aqueous dispersion primer, ready for handling.

2. The aqueous dispersion primer according to claim 1, comprising:
    a) 27.5 to 40% by weight of the silanised styrene-acrylate copolymer; and
    e) 47% to 64% by weight of water,
the sum of the components a) to e) being 100% of the mass of the aqueous dispersion primer.

3. The aqueous dispersion primer according to claim 1, wherein a proportion of polymerised vinylidene chloride in the vinylidene chloride-acrylate copolymer is at least 60% by weight.

4. The aqueous dispersion primer according to claim 1, wherein paraffin wax in the styrene-butadiene copolymer-paraffin wax mixture is a hard paraffin wax.

5. The aqueous dispersion primer according to claim 1, wherein no organic solvents are contained in the aqueous dispersion primer.

6. The aqueous dispersion primer according to claim 1, wherein the one or more additives includes an emulsifier, a preservative, an antifoaming agent, a wetting aid, a rheological aid, an antioxidant, a film-forming aid, a base, a pH buffer, a surface-active substance, zinc oxide, magnesium oxide or a combination of these components.

7. The aqueous dispersion primer according to claim 1, comprising:
    b) 7.5% to 17.5% by weight of the vinylidene chloride-acrylate copolymer, and
    e) 47% to 64% by weight of water, the sum of the components a) to e) being 100% of the mass of the aqueous dispersion primer.

8. The aqueous dispersion primer according to claim 1, comprising:
    c) 0.5 to 5.5% by weight of the styrene-butadiene copolymer-paraffin wax mixture, and
    e) 47% to 64% by weight of water, the sum of the components a) to e) being 100% of the mass of the aqueous dispersion primer.

9. The aqueous dispersion primer according to claim 1, comprising:
    e) 47 to 64% by weight of water, the sum of the components a) to e) being 100% of the mass of the aqueous dispersion primer.

10. The aqueous dispersion primer according to claim 1, comprising:
    d) 0.5 to 5% by weight of the one or more additives, and
    e) 47% to 64% by weight of water, the sum of the components a) to e) being 100% of the mass of the aqueous dispersion primer.

11. A coating of a subfloor common in interior construction wherein the subfloor includes concrete, cement, cement screed, cement flow screed, cement motar, cement-bounded wood fibre, ceramics, natural stone, calcium sulphate screed, calcium sulphate flow screed, magnesite screed, mastic asphalt, wood, fibreboard, plywood, gypsum, gypsum fibreboard, gypsum plasterboard, hardboard or mineral leveling compound, said coating comprising:
    a) ≥45% by weight of silanised styrene-acrylate copolymer,
    b) ≥14% by weight of vinylidene chloride-acrylate copolymer,
    c) ≥1% by weight styrene-butadiene copolymer-paraffin wax mixture and
    d) ≥1% by weight of one or more additives,
the percentage data relating to a mass of the coating.

12. The coating according to claim 11, comprising:
    a) 52 to 80% by weight of the silanised styrene-acrylate copolymer.

13. The coating according to claim 11, comprising:
    b) 14% to 35% by weight of the vinylidene chloride-acrylate copolymer.

14. The coating according to claim 11, comprising:
    c) 1 to 11% by weight of the styrene-butadiene copolymer-paraffin wax mixture.

15. The coating according to claim 11, comprising:
    d) 1 to 10% by weight of the one or more additives.

* * * * *